May 29, 1956 E. J. FREY 2,747,801
MIXING VALVE FOR DOMESTIC APPLIANCES
Filed Nov. 18, 1952 4 Sheets-Sheet 1
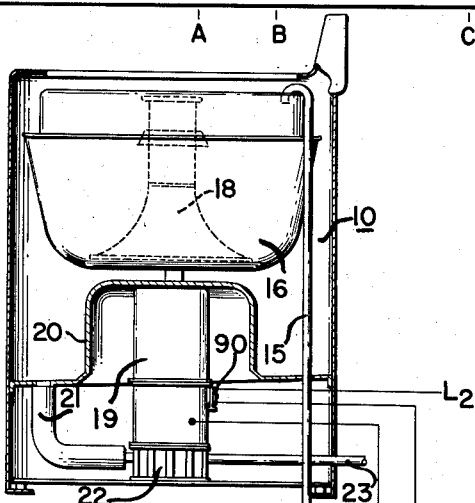
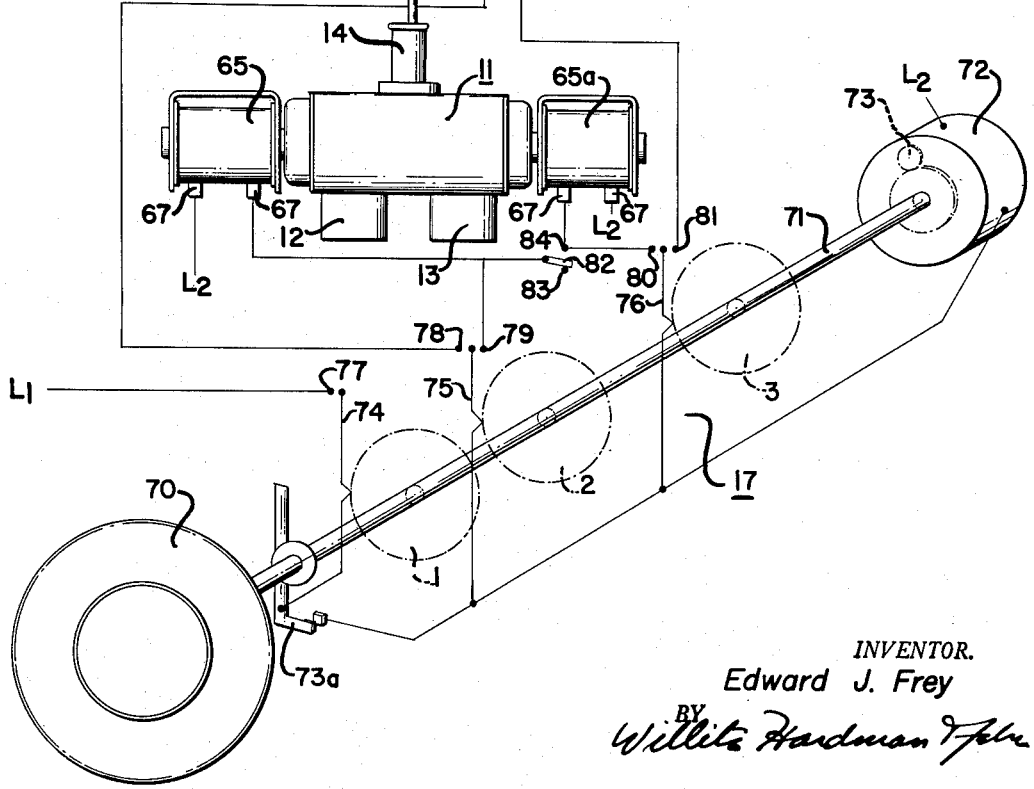
INVENTOR.
Edward J. Frey
BY
Willits Hardman Fehr
Attorneys May 29, 1956 E. J. FREY 2,747,801
MIXING VALVE FOR DOMESTIC APPLIANCES
Filed Nov. 18, 1952 4 Sheets-Sheet 2

INVENTOR.
Edward J. Frey
BY
Attorneys

May 29, 1956  E. J. FREY  2,747,801
MIXING VALVE FOR DOMESTIC APPLIANCES
Filed Nov. 18, 1952  4 Sheets-Sheet 3

INVENTOR.
Edward J. Frey
BY
Attorneys

May 29, 1956  E. J. FREY  2,747,801
MIXING VALVE FOR DOMESTIC APPLIANCES
Filed Nov. 18, 1952  4 Sheets-Sheet 4
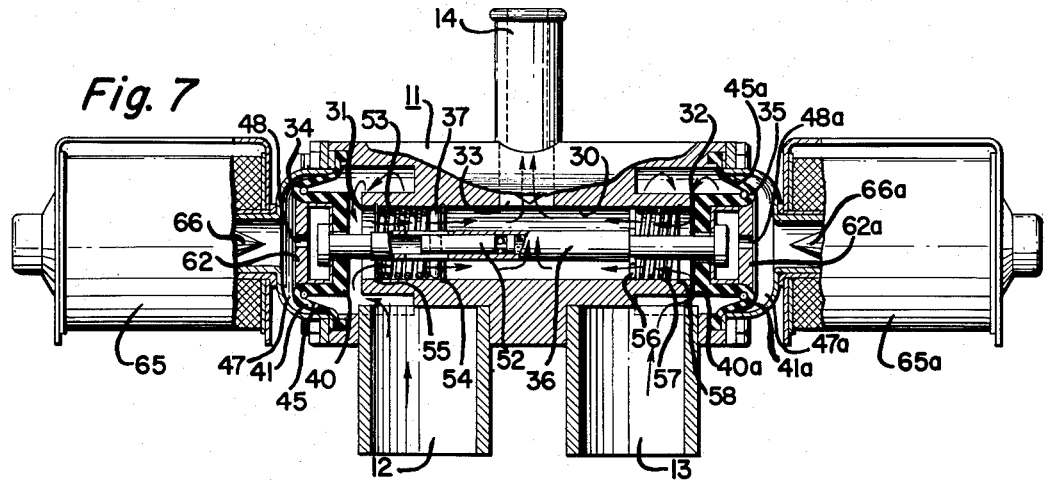
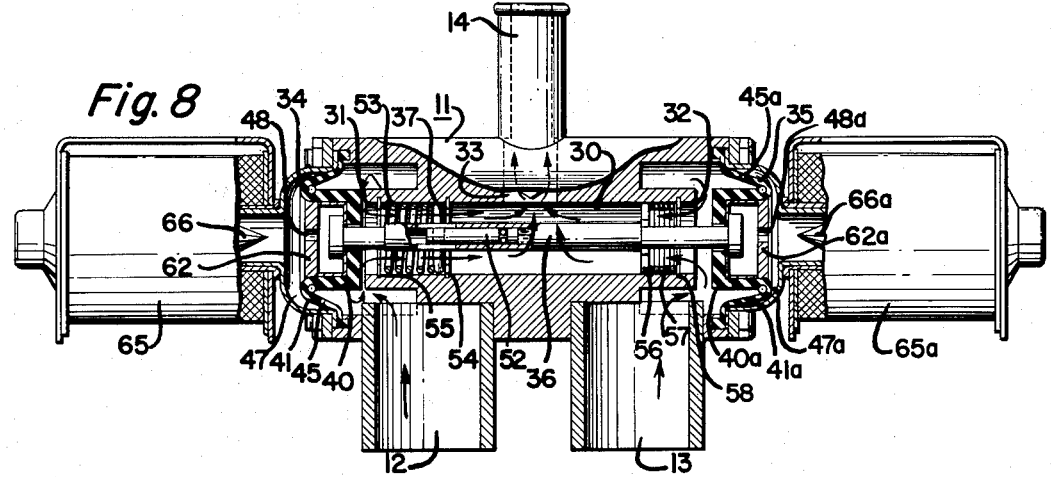
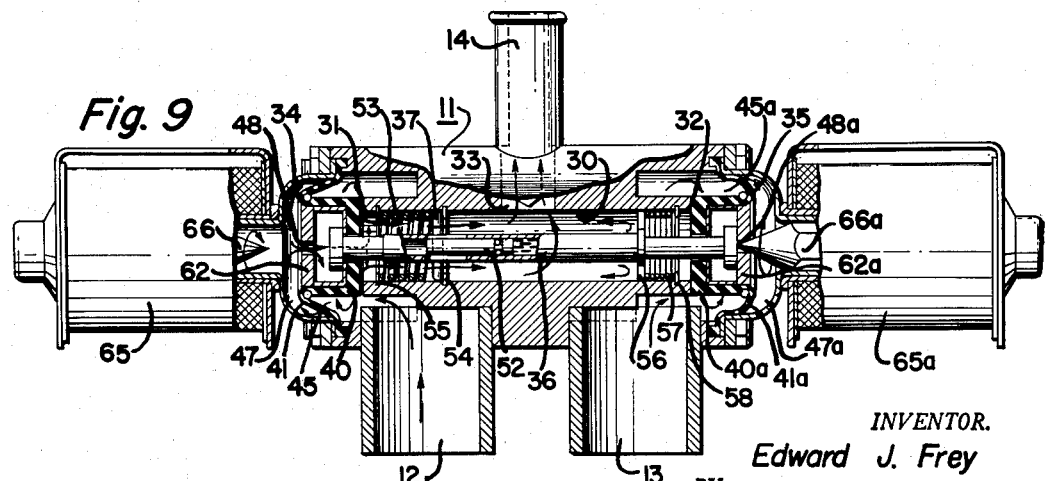
INVENTOR.
Edward J. Frey
BY
Attorneys

United States Patent Office 2,747,801
Patented May 29, 1956

2,747,801

MIXING VALVE FOR DOMESTIC APPLIANCES

Edward J. Frey, Dayton, Ohio, assignor to General Motors Corporation, Detroit, Mich., a corporation of Delaware Application November 18, 1952, Serial No. 321,258

21 Claims. (Cl. 236—12)

This invention relates to domestic appliances and more particularly to clothes washing machines.

An object of this invention is to provide a washing machine with a simplified water supply.

Another object of this invention is to provide a simplified hot and cold water mixing and regulating structure for clothes washing machines and the like.

Another object of the invention is to provide a mixing thermostatic valve in which the thermostat does not cut off the unmixed hot water when hot water only is being used.

Further objects and advantages of the present invention will be apparent from the following description, reference being had to the accompanying drawings wherein a preferred form of the invention is clearly shown.

In the drawings:

Figure 1 is a diagrammatic representation of the washing machine, fluid regulating structure and timer.

Figure 2 is a chart indicating a schedule of operations to be performed in the washing machine.

Figure 7 is a view similar to Figure 5, on a reduced scale, showing the position of the parts when the hot water supply is not very hot.

Figure 8 is a view similar to Figure 7 showing the position of the parts when the hot water supply is very hot.

Figure 9 is a view similar to Figure 7 showing the position of the parts when only hot water is being supplied to the washing machine.

Figures 3, 4:
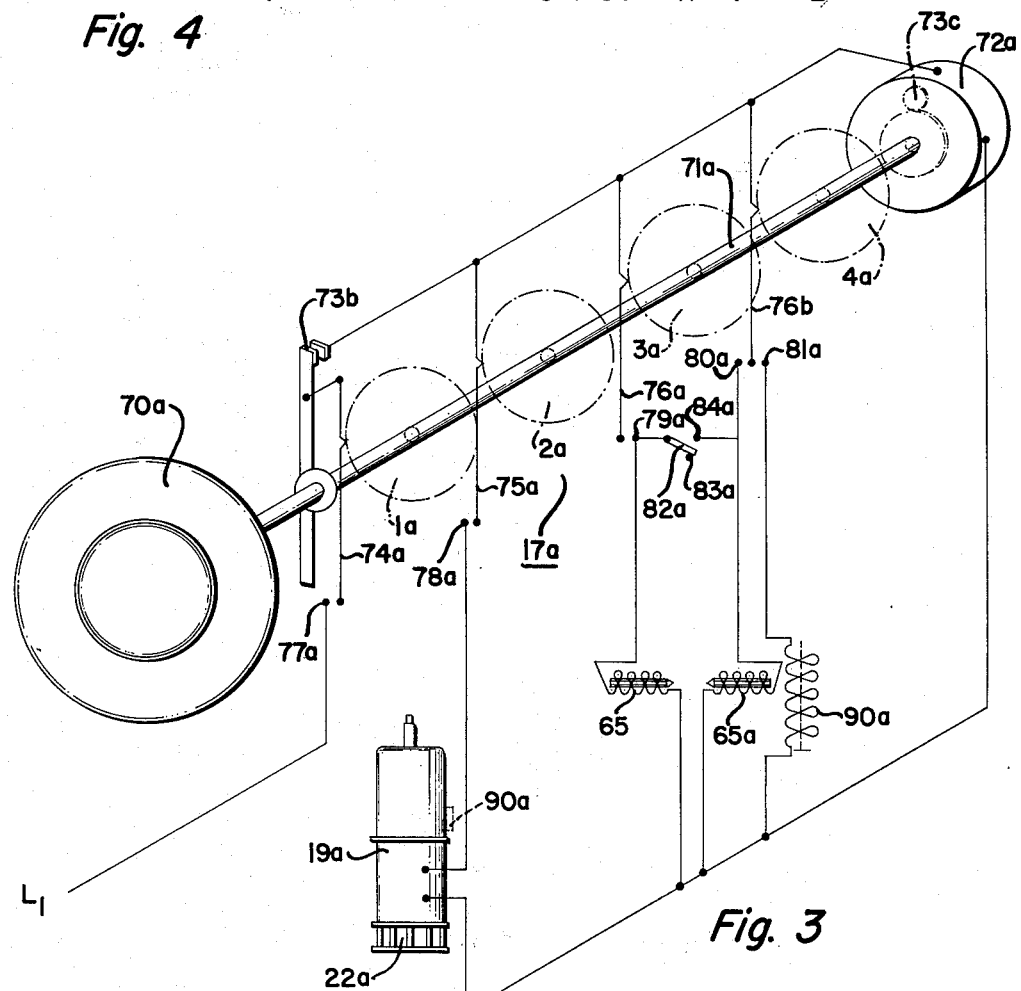
Figure 3 is a modified timer to be substituted for the timer shown in Figure 1.
Figure 4 is a chart, similar to Figure 2, showing the schedule of operations to be controlled by the timer of Figure 3.
Figure 5:
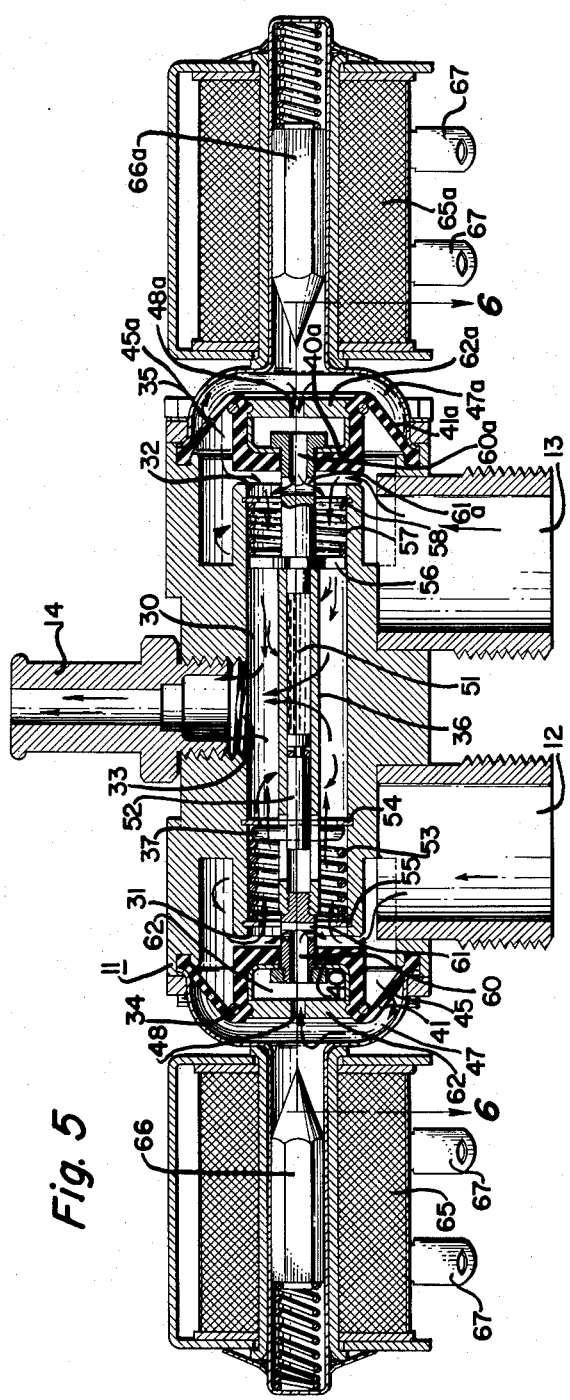
Figure 5 is a cross-section of the fluid regulating structure.
Figure 6:
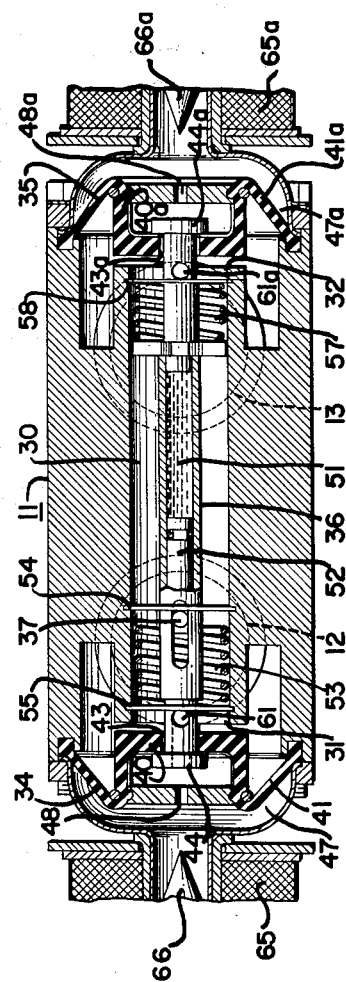
Figure 6 is a cross-section transverse to Figure 5 and taken generally along the line 6—6 of Figure 5.

A washing machine 10 is supplied with water by the fluid regulating structure 11 which receives hot water in the unmixed hot water inlet 12 and cold water in the unmixed cold water inlet 13 and supplies water (either mixed hot and cold water, or hot water alone) to the washing machine through the "mixed" fluid outlet 14 connected by the pipe 15 with the tub 16 of the washing machine. The fluid regulating structure and the washing machine are controlled by a timer 17 to perform the operations indicated in the chart shown in Figure 2, or any similar set of operations.

The washing machine also includes an agitator 18, a motor-transmission unit 19, a bulkhead 20 which is connected by a hose 21 with a water pump 22 capable of pumping the discharged water through the pipe 23 to a stationary tub or the like. The general arrangement of the timer may be similar to that shown in a patent to Sisson 2,520,695, patented August 29, 1950. The motor-transmission unit 19 may be similar in construction and operation to that disclosed in the patent to Clark 2,422,395, patented June 17, 1947. The general arrangement of the tub, agitator, bulkhead and pump may be similar to that disclosed in the patent to Clark, 2,366,236, patented January 2, 1945. Washing machines, timers, etc., other than those disclosed in the above patents may be used, if desired.

*The fluid regulating structure*

My simplified fluid regulating structure includes an outer structure having the two unmixed fluid inlets 12 and 13 and the mixed fluid outlet 14, heretofore referred to. It also has an inner structure preferably in the form of a longitudinal channel 30 with inner structure inlets at its ends 31 and 32 in fluid flow relationship to said inlets 12 and 13 respectively and connected at an intermediate point 33 to said outlet 14. Pilot operated valves 34 and 35 are placed at the ends or inlets 31 and 32 of the channel 30. A thermostatic element, or rod, 36, of fixed length, is placed in said channel 30 and has limited lost-motion connections with said valves 34 and 35. An abutment 37, in the form of a pin, is engageable by said thermostatic element 36 to cause longitudinal movement of said thermostatic element in said channel 30, and also of said valves 34 and 35 with respect to the ends 31 and 32 of said channel.

There is a lost-motion connection between the thermostatic element 36 and the valves 34 and 35. This lost-motion connection permits the rod to have a lost-motion pushing engagement with respect to a valve (either 34 or 35) when the rod moves toward such valve, and a fixed pulling engagement with such valve in the other direction when such valve attempts to open.

The valves 34 and 35 each has, respectively, a central core 40 and 40a, and a peripheral web 41 and 41a. The central cores have one side engageable with the respective ends 31 and 32 of the channel. The peripheral webs 41 and 41a are both exposed on the same side to the fluid flowing from the inlets 12 and 13 respectively to the ends 31 and 32 of the channel. The thermostatic element 36 passes loosely through openings 43 and 43a in the respective cores and has pulling abutments 44 and 44a on the other side of the cores.

Each of said peripheral webs 41 and 41a has, respectively, a limited bleeder opening 45 and 45a connecting the respective inlets 12 and 13 with the "other sides" 47 and 47a of the valves. Each of the central cores 34 and 35 has a less limited (higher capacity) bleeder starting at openings 48 and 48a respectively from the respective "other side" 47 and 47a of the valve to the channel 30. When the less limited bleeder is open at 48 or 48a, as shown in Figure 1, the fluid pressure on the "other side" 47, or 47a, is less than on the opposite (inlet 12 or 13) side of the valve and causes it to open. When the less limited bleeder is closed at 48 or 48a, as shown at the right side of Figure 9, the total fluid pressure on the side 47, or 47a, is more than on the opposite (inlet 12 or 13) side of the valve (because of the low fluid pressure adjacent the core in channel 30) and causes the valve to close.

The thermostatic element or rod 36 may take the form of a cylinder containing a thermostatic medium 51 sealed by a slidable plunger 52. The plunger 52 is connected with the abutment or pin 37 in such a manner that the rod 36 is caused to move longitudinally in response to expansion and contraction of the medium 51 as long as the pin 37 remains stationary under the action of strong spring 53. The pin 37 is held against a fixed ring 54 by the spring 53 as long as there is no undue expansion of the thermostatic medium 51. The spring 53 is held against axial movement at its other end by the fixed ring 55. The rod 36 is attached at its other end to a longitudinally movable spider 56 which presses against one end of a weaker spring 57. The other end of spring 57 abuts against the stationary ring 58. Within certain limits, the spider 56 and the rod 36 move back and forth in response to the thermostatic expansion of the medium 51 against the weaker spring tension of spring 57 until such time as the spring 57 is completely compressed as shown in Figures 8 and 9. (A fixed abutment to limit the right-hand movement of rod 36 may be used in lieu of the complete collapse of spring 57.) Thereafter, any further expansion of thermostatic medium 51 (which generally occurs when unmixed hot water only is being used) will cause the plunger 52 to move the pin 37 against the spring tension of spring 53, without further axially moving the rod 36 and thus preventing the cutting off of the unmixed hot water supply by the thermostat.

The thermostatic rod 36 has hollow extensions 60 and 60a fixed thereto by threaded engagement. These hollow extensions are provided with fluid passageways 61 and 61a. The cores 34 and 35 have covers 62 and 62a in which the openings 48 and 48a are formed. These openings 48 and 48a form, with the respective passageways 62 and 62a, the less limited (higher capacity) bleeders, heretofore referred to, from the sides 47 and 47a of the valves to the channel 30.

Solenoids 65 and 65a are provided with spring-pressed plungers 66 and 66a which have opening and closing engagement with the openings 48 and 48a. When the solenoids are energized, the plungers are retracted against spring action to open position, and vice versa. The solenoids are energized by electrical connections at 67.

The timer 17 is, in general, more specifically described in the Sisson patent. It is provided with a push-pull, rotatable knob 70 which is fixed to a shaft 71. The shaft carries cams 1, 2 and 3 and is rotated by a timer motor 72 having a gear reduction 73 of the character more specifically described in the Sisson patent, and which permits a slight axial movement of the shaft 71 when the knob 70 is pushed and pulled by the user. The axial movement of the shaft 71 opens and closes the contacts 73a. The rotation of the cams 1, 2 and 3 opens and closes the movable spring contacts 74, 75 and 76 against the stationary contacts 77, 78, 79, 80 and 81. In addition, there is a selective switch 82 which may be manually moved into contact with stationary contact 83 and abutment 84 to provide hot wash water (when closed on contact 83) or mixed wash water (when closed on abutment 84) for the first washing operation.

By my construction, I overcome an objection common to prior thermostatic mixing valves, i. e., to obtain hot water in one phase of the valve operation and mixed in the other phase without the use of a hot water by-pass or extra solenoid. Previously in a simple thermostatic mixing valve, when unmixed hot water is desired, the very action of the thermostat will cut off the hot water when the thermostat has expanded a certain amount in response to the temperature of the unmixed hot water (which generally is higher than the setting of the thermostat). Hence, previous valves are effective for mixing water but are ineffective when hot only is desired, because the thermostat tends to throttle or cut off the unmixed hot water supply.

Accordingly, I have provided a construction to insure a flow of unmixed hot water in spite of the action of the thermostat without the use of a by-pass or extra solenoid. This is achieved by limiting the effective motion of the thermostat element after it has expanded a certain amount (the relief spring 53 does this) and thus insuring that the hot water valve remains open a desired amount to supply the unmixed hot water.

*Operation in Figures 1 and 2*

In the operation of the device, clothes and a detergent are placed in the tub 16 of the washing machine, and the timer knob 70 is manually placed at the start position and is pushed in. This corresponds to position A in Figure 2. This closes the contacts 77 and 73a which electrically feed the movable contacts 74, 75 and 76 from $L_1$. At this time, electrical connections are made to energize the timer motor and (by closure of contacts 76 and 81) the hot water solenoid 65, thus opening the aperture 48, as shown in Figure 9. This releases the fluid pressure on the side 47 of the valve 34 and causes the valve to move to the left in response to hot water pressure. This provides a fluid passage between the core 40 and the end 31 of the channel 30, so that hot water can flow from the inlet 12 to the outlet 14 and from thence into the tub. The valve 34 remains open a sufficient amount regardless of thermostatic action, as previously described.

A suitable float control, pressure regulator, or similar control, well known in the art, may be provided which insures that a proper amount of water is fed into the tub 16 of the washing machine to fill the same. (If the switch 82 is closed on contact 84, instead of abutment 83, then a mixture of cold and hot water is fed to the tub at this time.) When the tub is filled to the proper height, at position B, the timer opens contacts 75 and 79 to stop the water flow and closes the electrical contacts 75, 78 so that the washer motor is energized while connected to the agitator 18 to cause agitation for the desired length of time. This is the initial detergent containing "wash" operation which usually is performed with the hottest water available, unless the nature of the fabrics requires the cooler mix obtained by placing the switch 82 in contact with 84. Thereafter, at position C, the spin solenoid 90 is energized by the closing of contacts 76, 81 causing rotation of the tub 16 to centrifugally wring the clothes. The timer, at position D, disconnects all of the elements except the timer motor for a half-minute period of time and then, at position E, energizes the hot and cold solenoids 65 and 65a (by closing contacts 75—79 and 76—80), thus feeding mixed water to the tub 16. This is accomplished by opening both of the openings 48 and 48a thus causing both valves 34 and 35 to move away from the respective ends 31 and 32 of the channel 30 as shown in Figures 5 to 8. This establishes water flow connections between the inlets 12 and 13 and the outlet 14 and thence to the tub 16 for a sufficient length of time to fill the tub with mixed hot and cold water to the proper level. Thereafter at F, the washer motor and the agitator are energized (by closing contacts 75, 78) for a sufficient length of time to agitate the clothes in the first rinse water. At G, the spin solenoid 90 is energized, by closing 76, 81, thus causing the tub to spin and wring the clothes. Thereafter at H, all of the elements, except the timer motor, are again deenergized for half a minute, after which a second rinse operation is started. This occurs at I when mixed water is supplied, the tub being filled at J when the agitator is actuated. The tub is spun from K to M for another time. The timer stops at M when the contacts 74 and 77 (and all other timer contacts) are opened, thus disconnecting the entire machine from $L_1$. This completes the entire washing operation.

Figures 7, 8 and 9 show the thermostatic action under different conditions.

In Figure 7, the water entering at 12 is not very hot. This has caused the thermostatic medium to contract and move the rod 36 to the left, thus pulling valve 35 close to end 32 and allowing valve 34 to move relatively far from end 31. This supplies a large proportion of the water from inlet 12 to compensate for the fact that this water is not very hot. The structure 11 balances at a position to supply water of the desired temperature, within permissible limits.

In Figure 8, the water entering at 12 is very hot, tending to make the mix in channel 30 too hot. This causes thermostatic medium 51 to expand and move the rod 50 to the right, thus pulling valve 34 close to end 31 and allowing valve 35 to move relatively far from end 32. This supplies a greater proportion of cold water from inlet 13 to compensate for the fact that the water entering 12 is abnormally hot. Again, the structure 11 balances at a position to supply water of desired temperature, within permissible limits.

In Figure 9, the structure 11 supplies only hot water from inlet 12 as indicated at A—B, Figure 2. The valve 35 has been closed by the deenergization of solenoid 65a, which has allowed plunger 66a to close bleeder opening 48a. The hot water flowing into channel 30 has expanded thermostatic medium 51 materially and has caused rod 36 to move to the right until spring 57 has been compressed completely. The limit of movement of rod 36 to the right is not sufficient to open valve 35. The length of rod 36 is sufficient to allow valve 34 to remain open for the necessary volume of water. Any further expansion of thermostatic medium 51 will merely compress spring 53 without further moving rod 36, as the rod has reached its limit of movement to the right. The position of the structure as shown in Figure 9 is that which occurs when the first filling operation takes place from A to B, Figure 2, when only hot water is supplied to the tub 16 for the detergent containing initial wash.

Operation in Figures 3 and 4

In the modification shown in Figures 3 and 4, a complete wash includes the following operations: a first wash fill, agitation, overflow, spin, rinse fill, agitation, overflow, and final spin. The timer 17a is similar to timer 17. It has knob 70a connected to a shaft 71a which is actuated by a timer motor 72a through gears 73c. The shaft also has axial movement, as heretofore described. The axial movement opens and closes the contacts 73b, and the rotational movement of the cams 1a, 2a, 3a and 4a causes movement of the spring contacts 74a, 75a, 76a and 76b to close against the stationary contacts 77a, 78a, 79a, 80a and 81a in a manner to energize the timer motor 72a, the washer motor, the hot and cold water solenoids 65 and 65a and the spin solenoid 90a (which is really mounted on casing 19a at position 90aa) to produce the cycle of operations shown in chart of Figure 4. In addition, there is a selector switch 82a which may be moved to abutment 83a or to stationary contact 84a to provide hot or mixed water for the first washing action.

Clothes and detergent are placed in the tub. Knob 70a is moved to the "start" position and pushed in (if necessary). This corresponds to position Q in Figure 4. At this time contacts 74a—77a, 73b and 76a—79a are closed, thus actuating the timer motor and hot solenoid. This supplies hot water only to the tub (unless switch 82a is moved to 84a when mixed hot and cold water would be supplied), which becomes filled at R when the filling action is stopped by the opening of contacts 76a—79a. The washer motor and agitator are now actuated by the closing of contacts 75a—78a for the first detergent containing wash. At S hot and cold water are introduced while the agitator continues to operate, by the closing of contacts 76a—79a and 76b—80a. This causes a continuing overflow of tub 16 from S to T, which permits the scum to overflow. At T, the water flow and agitation are stopped and a tub spin is started by the opening of contacts 76a—79a and 76b—80a and the closing of contacts 76b—81a. This continues to U when a half-minute pause is effected throughout except in the timer motor, by the opening of all timer contacts except 73b and 74a—77a. At V, a hot and cold mix water-fill is initiated by the closing of the timer contacts 76a—79a, 76b—80a, which energize the solenoids 65 and 65a. This fill continues to Y, but at X the agitator is started by closing contacts 75a—78a thus simultaneously agitating the clothes while overflowing water and scum from the tub to Y. At this point, the water flow and agitation are stopped and the tub is spun by the closing of contacts 76b—81a, and opening of contacts 76a—79a, 76b—80a, as heretofore described. The spinning operation continues to Z, when the entire operation is completed and stopped by opening of the contacts 74a—77a (and all other timer contacts) which disconnects the entire machine from L₁.

While the water and mixing structure 11 has been described as used with an automatic timer 17 or 17a, it is understood that it may be manually controlled by a manual switch arrangement to energize the solenoids and washing machine for non-timer operation. If desired, the user can control the filling operation by sight, by a float control switch, or other control, as is well known.

While the form of embodiment of the invention as herein disclosed constitutes a preferred form, it is to be understood that other forms might be adopted as may come within the scope of the claims which follow.

What is claimed is as follows:

1. A fluid regulating structure having: two unmixed fluid inlets; a mixed fluid outlet; a channel having ends in fluid flow relationship to said inlets respectively and connected to said outlet; pressure operated diaphragm valves at said ends; a thermostatic element of fixed length responsive to fluid temperatures in said channel and having lost-motion connection with said valves; and means to cause longitudinal movement of said thermostatic element and of said valves with respect to the ends of said channel.

2. A fluid regulating structure having: two unmixed fluid inlets; a mixed fluid outlet; a channel having ends in fluid flow relationship to said inlets respectively and connected to said outlet; pressure operated diaphragm valves at said ends; an element of fixed length in said channel and having a lost-motion engagement with said valves limiting the extent of opening of said valves and permitting free closing of said valves; and means to move said element longitudinally in said channel to cause relative movement of said valves with respect to said ends.

3. A fluid regulating structure having: two unmixed fluid inlets; a mixed fluid outlet; a channel having ends in fluid flow relationship to said inlets respectively and connected to said outlet; flexible diaphragm valves at said ends; each of said valves having a central core and a peripheral web; said central core having one side engageable with a respective end of said channel; said peripheral web being exposed on the said one side to the fluid flowing from said inlet to said end of the channel; an element of fixed length in said channel passing loosely through said cores respectively and having pulling abutments on the other side of said cores; and means to move said element longitudinally in said channel to cause relative movement of said valves with respect to said ends.

4. A fluid regulating structure having: two unmixed fluid inlets; a mixed fluid outlet; a channel having ends in fluid flow relationship to said inlets respectively and connected to said outlet; flexible diaphragm valves at said ends; each of said valves having a central core and a peripheral web; said central core having one side engageable with a respective end of said channel; said peripheral web being exposed on the said one side to the fluid flowing from said inlet to said end of the channel; an element of fixed length in said channel passing loosely through said cores respectively and having pulling abutments on the other side of said cores; means to move said element in said channel to cause relative movement of said valves with respect to said ends; each of said peripheral webs having a limited bleeder connecting a respective inlet with the other side of said valve; each of said central cores having a less limited, higher capacity, bleeder from said respective other side to said channel; and a solenoid for each of said valves with a plunger opening and closing a respective higher capacity bleeder.

5. A fluid regulating structure having: a fluid inlet; a fluid outlet; a channel having an end in fluid flow relationship with said inlet and outlet; a flexible diaphragm valve at said end; said valve having a central core and a peripheral web; said central core having one side engageable with said end of said channel; said peripheral web being exposed on the same side to the fluid flowing from said inlet to said end; a rod in said channel passing loosely through said core and having a pulling abutment on the other side of said core; thermostatic means to adjust said rod longitudinally in said channel to vary the degree of free opening from said core to said end of said channel; and means to move said valve against and away from said end separately and independently from said rod, the extent of movement of said valve away from said end being limited by said rod.

6. A fluid regulating structure having: a fluid inlet; a fluid outlet; a channel having an end in fluid flow relationship with said inlet and outlet; a flexible diaphragm valve at said end; said valve having a central core and a peripheral web; said central core having one side engageable with said end of said channel; said peripheral web being exposed on the same side to the fluid flowing from said inlet to said end; a rod in said channel passing loosely through said core and having a pulling abutment on the other side of said core; thermostatic means to move said rod in said channel to adjust the degree of free opening from said core to said end of said channel; said peripheral web having a limited bleeder connecting said inlet with the other side of said valve; said central core having a less limited, higher capacity, bleeder from said other side to said channel; and a solenoid with a plunger opening and closing said less limited bleeder separately and independently from said rod, the extent of movement of said valve away from said end being limited by said rod.

7. A fluid regulating structure having: a channel having ends into which two unmixed fluids flow respectively; valves movable toward and away from said ends; a thermostatic rod loosely connected to said valves with pulling abutments limiting the degree of free opening of said valves and partially closing said valves with the longitudinal movement of said rod; said rod having a thermostatically moved wall; an abutment between said wall and channel causing said rod to move longitudinally in said channel in response to movement of said wall to regulate said valves; and means to move said valves against and away from said ends separately and independently from said rod, the extent of movement of said valves away from said ends being limited by said rod.

8. A fluid regulating structure having: a channel having ends into which two unmixed fluids flow respectively; valves movable toward and away from said ends; a thermostatic rod loosely connected to said valves with pulling abutments limiting the degree of free opening of said valves and partially closing said valves with the longitudinal movement of said rod; said rod having a cavity containing thermostatic fluid; said cavity having a movable end wall; an abutment between said end wall and channel causing said rod to move longitudinally in said channel in response to movement of said end wall to regulate said valves; and means to move said valves against and away from said ends separately and independently from said rod, the extent of movement of said valves away from said ends being limited by said rod.

9. A fluid regulating structure having: a fluid inlet; a fluid outlet; a channel having an end in fluid flow relationship with said inlet and outlet; a flexible diaphragm valve at said end; said valve having a central core and a peripheral web; said central core having one side engageable with said end of said channel; said peripheral web being exposed on the same side to the fluid flowing from said inlet to said end; a hollow rod in said channel passing through said core and being open on the other side of said core and being loosely connected to move said core and having a pulling abutment to cooperate with said other side of said core; means to move said rod longitudinally in said channel to vary the movable distance of said core from said end of said channel; said peripheral web having a limited bleeder connecting said inlet with the other side of said valve; said central core having a cover on said other side provided with an aperture which forms a less limited, higher capacity, bleeder with said hollow rod from said other side to said channel; and a solenoid with a plunger opening and closing said aperture.

10. A fluid regulating structure having: two unmixed fluid inlets; a mixed fluid outlet; a channel having ends in fluid flow relationship to said inlets respectively and connected to said outlet; flexible diaphragm valves at said ends; each of said valves having a central core and a peripheral web; said central core having one side engageable with a respective end of said channel; said peripheral web being exposed on the said same side to the fluid flowing from said inlet to said end of the channel; a thermostatic element in said channel having hollow extensions passing loosely through said cores respectively and having pulling abutments on the other side of said cores; a structural connection between said thermostatic element and said channel causing said element to move in said channel to cause relative movement of said valves with respect to said ends; each of said peripheral webs having a limited bleeder connecting a respective inlet with the other side of said valve; each of said central cores having a cover on the other side provided with an aperture which forms a less limited, higher capacity, bleeder with a respective hollow extension from said respective other side to said channel; and a solenoid for each of said valves with a plunger opening and closing a respective aperture.

11. A fluid regulating device comprising: an outer structure having two unmixed fluid inlets and a mixed fluid outlet; an inner structure having two inner structure inlets in respective fluid flow relationship to said first named inlets and having fluid flow relationship to said mixed fluid outlet; valves at both inner structure inlets; a thermostatic element between said inner structure inlets and outer structure outlet; said thermostatic element having lost-motion connection with said valves permitting said valves to open and close freely between said inner structure inlets and an opening limit determined by the position of said thermostatic element; means to permit movement of said thermostatic element to vary the opening limit of said valves with respect to said inner structure inlets; means to prevent movement of said thermostatic element from varying the opening limit of one of said valves beyond a predetermined open minimum; and means opening and closing said valves between said opening limits and inner structure inlets independently of said thermostatic element.

12. A fluid regulating device comprising: an outer structure having two unmixed fluid inlets and a mixed fluid outlet; an inner structure having two inner structure inlets in respective fluid flow relationship to said first named inlets and having fluid flow relationship to said mixed fluid outlet; valves at both inner structure inlets; a thermostatic element between said inner structure inlets and outer structure outlet; a lost-motion connection between said thermostatic element and said valves permitting said valves to open and close freely between said inner structure inlets and an opening limit determined by the position of said thermostatic element and permitting said thermostatic element to vary the opening limit of said valves to provide mixed fluid under thermostatic control; means to prevent said thermostatic element from varying the opening limit of one of said valves beyond a predetermined open minimum to provide one unmixed fluid; and means opening and closing said valves between said opening limits and inner structure inlets independently of said thermostatic element.

13. A fluid regulating device comprising: an outer structure having an unmixed hot fluid inlet, an unmixed cold fluid inlet and a mixed fluid outlet; an inner structure having two inner structure inlets in respective fluid flow relationship to said first named inlets and having fluid flow relationship to said mixed fluid outlet; hot and cold fluid valves at the respective inner structure inlets; hot and cold fluid control solenoids respectively for said valves causing said valves to open and close under fluid pressure from said unmixed fluid inlets; a thermostatic element between said inner structure inlets and outer structure outlet; a lost-motion connection between said thermostatic element and said valves and permitting said valves to open and close freely between said inner structure inlets and an opening limit determined by the position of said thermostatic element to vary the opening limit of said valves while both of said valves are moved to open position by said solenoids to provide mixed fluid under thermostatic control; and means to prevent said thermostatic element from closing the hot fluid valve beyond a predetermined open minimum when said hot fluid valve is moved to open position by said hot fluid control solenoid and while said cold fluid valve is moved to closed position by said cold fluid control solenoid.

14. A fluid regulating device comprising: an outer structure having an unmixed hot fluid inlet, an unmixed cold fluid inlet and a mixed fluid outlet; an inner structure having two inner structure inlets in respective fluid flow relationship to said first named inlets and having fluid flow relationship to said mixed fluid outlet; hot and cold fluid pilot operated valves at the respective inner structure inlets; hot and cold fluid control solenoids respectively causing pilot action for said valves to open and close them under fluid pressure from said unmixed fluid inlets; a thermostatic element between said inner structure inlets and outer structure outlets; a lost-motion connection between said thermostatic element and said valves permitting said valves to open and close freely between said inner structure inlets and an opening limit determined by the position of said thermostatic element; causing said thermostatic element to vary the opening limit of said valves while both of said valves are caused to move to open position by said solenoids to provide mixed fluid under thermostatic control; and means to prevent said thermostatic element from closing the hot fluid valve beyond a predetermined open minimum when said hot fluid valve is moved to open position by said hot fluid control solenoid and while said cold fluid valve is moved to closed position by said cold fluid control solenoid.

15. A mixer having a hot fluid inlet, a cold fluid inlet, a fluid outlet receiving fluid from said inlets, a hot fluid pilot operated valve having a hot fluid pilot opening connected with said hot fluid inlet, a cold fluid pilot operated valve having a cold fluid pilot opening connected with said cold fluid inlet, and a thermostatically operated connecting member for said valves having opening limit stops for said valves of fixed length between said stops and governing the maximum and relative fluid flow through said valves, one of said stops being loosely connected with its respective valve to permit said valve to be closed by its pilot independently of the other valve.

16. A mixer having a hot fluid inlet, a cold fluid inlet, a fluid outlet receiving fluid from said inlets, a hot fluid pilot operated valve having a hot fluid pilot opening connected with said hot fluid inlet, a cold fluid pilot operated valve having a cold fluid pilot opening connected with said cold fluid inlet, and a thermostatically operated connecting member for said valves having opening limit stops for said valves of fixed length between said stops and governing the maximum passage of fluid through one of said pilot openings and governing the relative fluid flow through said pilot operated valves, one of said stops being loosely connected with its respective valve to permit said valve to be closed by its pilot independently of the other valve.

17. A mixer having a hot fluid inlet, a cold fluid inlet, a fluid outlet receiving fluid from said inlets, a hot fluid pilot operated valve having a hot fluid pilot opening connected with said hot fluid inlet, a cold fluid pilot operated valve having a cold fluid pilot opening connected with said cold fluid inlet, and a thermostatically operated connecting member for said valves having opening limit stops for said valves of fixed length between said stops and governing the maximum passage of fluid through said hot fluid pilot opening and governing the position of said pilot operated valves and governing the relative fluid flow through said pilot operated valves, one of said stops being loosely connected with its respective valve to permit said valve to be closed by its pilot independently of the other valve.

18. A mixer having a hot fluid inlet, a cold fluid inlet, a fluid outlet receiving fluid from said inlets, a hot fluid pilot operated valve having a hot fluid pilot opening connected with said hot fluid inlet, a cold fluid pilot operated valve having a cold fluid pilot opening connected with said cold fluid inlet, and a thermostatically operated connecting member for said valves having opening limit stops for said valves of fixed length between said stops and having a free passageway in said member connecting one of said pilot openings with said fluid outlet and governing the relative fluid flow through said pilot operated valves, one of said stops being loosely connected with its respective valve to permit said valve to be closed by its pilot independently of the other valve.

19. A mixer having a hot fluid inlet, a cold fluid inlet, a fluid outlet receiving fluid from said inlets, a hot fluid pilot operated valve having a hot fluid pilot opening connected with said hot fluid inlet, a cold fluid pilot operated valve having a cold fluid pilot opening connected with said cold fluid inlet, and a thermostatically operated connecting member for said valves having opening limit stops for said valves of fixed length between said stops and having a free passageway in said member connecting said cold fluid pilot opening with said fluid outlet and governing the relative fluid flow through said pilot operated valves, the stop adjacent said hot fluid valve being loosely connected with said hot fluid valve to permit said hot fluid valve to be closed by its pilot independently of the cold fluid valve.

20. A mixer having a hot fluid inlet, a cold fluid inlet, a fluid outlet receiving fluid from said inlets, a hot fluid pilot operated valve having a hot fluid pilot opening connected with said hot fluid inlet, a first solenoid controlling the pilot of said valve, a cold fluid pilot operated valve having a cold fluid pilot opening connected with said cold fluid inlet, a second solenoid controlling the pilot of said last named valve, a thermostatically operated connecting member for said valves having opening limit stops for said valves of fixed length between said stops and governing the maximum and relative fluid flow through said valves, one of said stops being loosely connected with its respective valve to permit said valve to be opened by its solenoid independently of the action of the other solenoid on its valve.

21. A mixer having a hot fluid inlet, a cold fluid inlet, a fluid outlet receiving fluid from said inlets, a hot fluid pilot operated valve having a hot fluid pilot opening connected with said hot fluid inlet, a first solenoid controlling the pilot of said valve, a cold fluid pilot operated valve having a cold fluid pilot opening connected with said cold fluid inlet, a second solenoid controlling the pilot of said last named valve, a thermostatically operated connecting member for said valves having opening limit stops for said valves of fixed length between said stops and governing the maximum and relative fluid flow through said valves, the stop for said hot fluid valve being loosely connected thereto to permit said hot fluid valve to be opened by said first solenoid independently of the action of said second solenoid on said cold fluid valve.

References Cited in the file of this patent

UNITED STATES PATENTS

| | | |
|---|---|---|
| 1,024,729 | Lawler | Apr. 30, 1912 |
| 2,305,151 | Fields | Dec. 15, 1942 |
| 2,510,369 | Bentsen | June 6, 1950 |
| 2,584,420 | Branson | Feb. 5, 1952 |
| 2,620,133 | Obermaier | Dec. 2, 1952 |

FOREIGN PATENTS

| | | |
|---|---|---|
| 923,176 | France | Feb. 17, 1947 |